April 15, 1969　　E. C. HOPKINSON ET AL　　3,439,165
RADIOACTIVITY WELL LOGGING SYSTEM HAVING
A MULTIPLE CONDUCTOR CABLE Filed Jan. 6, 1965　　　　　　　　　　　　　　Sheet 1 of 3

INVENTOR.
ERIC C. HOPKINSON
ARTHUR H. YOUMANS

ATTORNEY

INVENTOR.
ERIC C. HOPKINSON
BY ARTHUR H. YOUMANS

ATTORNEY

United States Patent Office 3,439,165
Patented Apr. 15, 1969

3,439,165
RADIOACTIVE WELL LOGGING SYSTEM HAVING A MULTIPLE CONDUCTOR CABLE
Eric C. Hopkinson and Arthur H. Youmans, Houston, Tex., assignors to Dresser Industries, Inc., Dallas, Tex., a corporation of Delaware
Filed Jan. 6, 1965, Ser. No. 423,811
Int. Cl. G01t 1/20
U.S. Cl. 250—71.5        6 Claims

ABSTRACT OF THE DISCLOSURE

A pulsed D-T accelerator is housed with a gamma ray detector within a logging tool, the detector being gated in synchronism with the pulsation of the accelerator. The source-detector spacing maximizes desirable gamma ray reception and minimizes undesirable radiation detection. The discriminator setting of the detector is set within a range of 1.9–2.4 mev. to further eliminate undesirable radiation detection. Neutron shielding, a mixture of boron-10 and epoxy resin, is arranged about the detector and instrument housing. An armored seven conductor cable, having its center conductor arranged to carry the logging detector output signal, connects the logging tool to the surface electronics.

This invention relates to radioactivity systems and apparatus for logging oil and gas wells, and is more particularly directed to an improved system for measuring the rate of decline of thermal neutrons in earth formations sought to be investigated.

There have recently been made commercially available to the oil and gas industry certain novel methods and apparatus for performing measurements of the characteristics of subsurface earth formations penetrated by a bore hole. These methods and apparatus, the essentials of which are disclosed in a co-pending U.S. patent application SN 292,927, filed July 5, 1963, now abandoned, by A. H. Youmans, may be briefly described as follows:

An elongated instrument containing a source of high energy neutrons, a radiation detector spaced axially from such source, and other components and electronics necessary to energize and control the source and detector, is passed through the bore hole or well by means of a cable. The source is pulsed during the passage of the instrument through the well so as to continuously emit discrete bursts of these high energy or "fast" neutrons so as to pulsedly irradiate adjacent sections of the bore hole and surrounding earth. These bursts of fast neutrons are promptly slowed to thermal energy by collisions with the nuclei of the formation substances and borehole fluids, and thereby establish discrete "populations" of thermal neutrons which thereupon decline at rates which are substantially dependent upon the macroscopic thermal neutron capture cross sections of the irradiated earth and borehole fluids. The borehole fluids often have higher cross sections than do the earth formation substances, and therefore the thermal neutrons in the borehole will generally disappear before the thermal neutrons in the formations.

The detector is preferably activated during two discrete preselected time intervals following each burst of fast neutrons from the source, and electrical signals indicative of each of these detected radiations are sent to the surface of the earth by way of the cable. At the surface, means are provided for counting these detected radiations and for making a graphic record of their number in correlation with the depth at which they were detected. Thereafter, a ratio may be taken of the number of radiations detected during the first interval to the number detected during the second interval, and this ratio then provides a measurement of the rate of decline of the thermal neutron population created by that particular burst of fast neutrons.

This novel logging technique provides many benefits which are unobtainable with methods and apparatus previously in use. However, the apparatus used to make this novel measurement is obviously much more complex than conventional logging apparatus, and has produced many problems not previously encountered. For instance, the source is preferably a deuterium-tritium accelerator of the type depicted in U.S. Patent No. 2,689,918, which produces 14.4 mev. neutrons which are capable of activating many nuclei not activated by lower energy neutrons from conventional sources. In particular, such neutrons activate oxygen nuclei which produce gamma rays in quantities sufficient to confuse a measurement directed to gamma rays produced by thermal capture.

Another problem involves the number of radiations which are detected by this new apparatus. It is well known that only a small portion of the sought for radiations will enter the borehole, and that most of them are lost in the earth. The efficacy of all such measurements depends entirely on obtaining a representative count of the total meaningful radiation which exists or is created. Since the detector is necessarily struck by only a portion of the rays which enter the borehole, even when the detector is rendered continually responsive during conventional logging operations, the number detected is only a small portion of the small portion which is theoretically available for detection. However, in the novel measurement the detector is necessarily activated or rendered responsive during only a portion of the time, and thus the counts obtained with the novel methods and apparatus are fewer than those obtained with conventional logging methods and apparatus. This lower counting rate is an aggravation of the problem which has always been present, and is rendered even more vexing by the presence of the oxygen gammas which have hitherto not been present. In other words, fewer of the sought-for gammas can be detected, and these are intermixed with increased numbers of unwanted gamma rays which bear no relation to the nuclear phenomenon intended to be measured.

A further problem is created by the additional power and control circuitry, which is unnecessary in the subsurface instruments in conventional systems, which is necessary in the new systems. For example, the gating and pulsing of the detector and source calls for elaborate circuitry which must be included in the instrument, and which is preferably energized and synchronized with circuitry and components at the surface. In addition, the accelerator requires control and monitoring equipment which must be connected to surface equipment, and which have not been necessary in conventional systems using encapsulated quantities of "naturally" radioactive material as their sources. Furthermore, the accelerator itself requires special power equipment which, in turn, must be energized and controlled from the surface of the earth.

It is well known that the output pulses from a radiation detector tend to become "smeared" when transmitted over a logging cable which may be several thousand feet long. Since each pulse is intended to represent a single radiation, and since these radiations strike the detector in a random manner, this smearing tends to "blend" close-spaced pulses to further reduce the counting rate of the system in a very deleterious manner. Moreover, where multi-conductor cable must be used to simultaneously transmit other signals to and from the subsurface equipment, the resulting "cross talk" produces further deleterious effects on the detector signal. The new logging system requires more conductors than ever before, and these additional conductors in the cable have further aggravated the problem.

These disadvantages of the new logging methods and apparatus, which are described in the aforementioned patent application SN 292,927, are significantly reduced or overcome with the present invention hereinafter described, and novel and improved apparatus is provided which develops a greatly improved and therefore more useful measurement of the rate of decline of a thermal neutron population in a formation of interest.

The advantages of the present invention are preferably attained with neutron-type well logging apparatus employing a pulsed D-T accelerator as a source of neutrons, a gamma ray detector including means for gating the detector in synchronism with the pulsation of the accelerator, a preselected source-detector spacing capable of maximizing the rate at which desired gamma radiation is detected and minimizing the rate at which certain undesired gamma radiation is detected, a discriminator setting such as will effectively eliminate certain other undesired radiation detection from the detector output signal, special neutron shielding arranged about the detector and instrument housing, and an armored seven-conductor logging cable having its center conductor arranged to carry the logging detector output signal to the surface.

Accordingly, it is an object of the present invention to provide novel apparatus for measuring the thermal neutron capture cross section of a subsurface formation traversed by a borehole.

It is a further object of the present invention to provide novel apparatus for measuring the decline rate of a thermal neutron population, wherein means are provided to detect a maximum number of radiations of a preselected character and to exclude a maximum number of other radiations of a preselected character.

It is another object of the present invention to provide novel apparatus for radioactivity well logging, wherein the center conductor in an armored multi-conductor cable is employed to transmit the logging detector output signal to the surface of the earth.

These and other objects and features of the present invention will be apparent from the following detailed description, wherein reference is made to the figures of the accompanying drawings.

Figure 1:
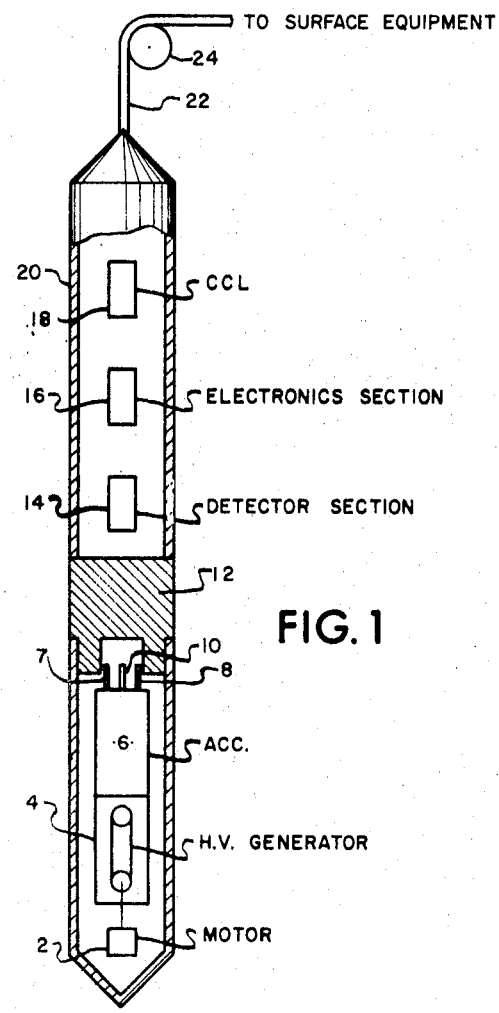
FIGURE 1 is a functional representation of a subsurface instrument adapted to measure the decline rate of thermal neutron populations in earth formations traversed by a borehole.

Referring now to FIGURE 1, there may be seen an elongated instrument housing 20 which is adapted to be passed longitudinally through a borehole, and which is supported in the borehole (not depicted) by means of a suitable well logging cable 22 extending to the surface of the earth. The cable 22 may be passed over a sheave wheel 24 which functions to measure the length of the cable 22 as it is paid into or drawn out of the well, and which thus provides (with other conventional equipment not depicted) a continuous indication of the depth at which the instrument 20 may be disposed in the well. The sheave wheel 24 may be supported in any convenient manner, such as by a traveling block suspended over the mouth of the borehole by a conventional derrick.

The radiation source may be seen to include a suitable D-T accelerator 6 energized by an electrostatic generator 4. A suitable generator 4 may be the well known Van de Graaff high voltage generator, such as that depicted in detail in the co-pending patent application SN 259,073, now abandoned, which was filed Feb. 18, 1963 by A. H. Youmans and E. C. Hopkinson. This type of generator utilizes a continuous belt which is driven by an electric motor 2. As shown in FIGURE 1, the accelerator 6 may be provided with two atmosphere control elements 7 and 8, of the type described in U.S. Patent No. 3,123,-739, although only one such element is required. The accelerator 6 is also preferably provided with a monitor detector 10, which is preferably an "end window" Geiger-Muller counter tube, and which should be mounted centrally in the target end of the accelerator 6 so that its window is adjacent the target of the accelerator 6 as depicted in FIGURE 1.

Also included in the instrument 20 is a logging detector 14, and other necessary electronics 16, as well as a typical casing collar locator 18. The instrument 20 includes a suitable radiation shield 12, which is preferably formed of tungsten, and which functions to prevent direct irradiation of the logging detector 14.

Figure 3:
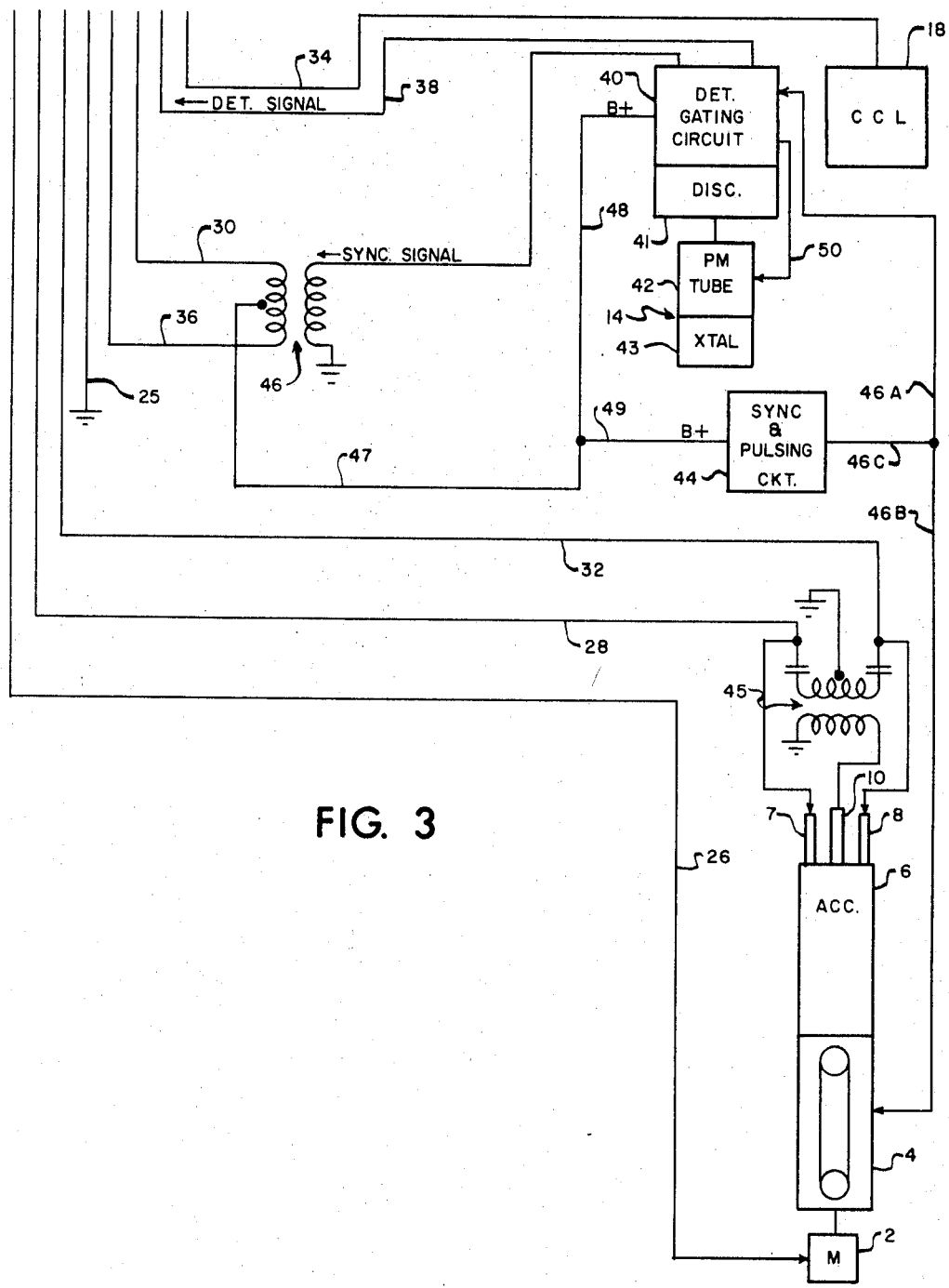
FIGURE 3 is a functional diagram of the major components of the circuitry in the subsurface instrument depicted in FIGURE 1.

Referring now to FIGURE 3, there may be seen a cross sectional representation of the logging cable 22 depicted pictorially in FIGURE 1, showing the grounded shield or armor 25, and showing six of the conductors 26–36 arranged equidistantly and circumferentially in insulation 23 about a seventh conductor 38. Conductors 26–36 also spiral up and down the length of the cable 26, in order to provide for flexibility.

Referring now to FIGURE 3, there may be seen a functional representation of the manner in which the various subsurface circuitry is interconnected with the conductors 26–28 in the cable 22, showing how conductor 26 is connected to apply power to the motor 2 which drives the belt (suggested) in the high voltage generator 4, and how conductors 28 and 32 are connected directly to the two atmosphere control elements 7 and 8. A transformer 45 is also shown having its center-tap-grounded primary winding connected between conductors 28 and 32 to form a balanced transmission line for carrying the output signal, from the monitor detector 10, to the surface. The output from the monitor detector 10 is connected to one end of the secondary winding of transformer 45 through suitable pulse shaping circuitry not depicted in FIGURE 3. The armor or shield 25, on cable 22, is merely shown in FIGURE 3 as a grounded conductor and will not be further discussed herein.

As hereinbefore explained, the accelerator 6, high voltage supply 4, and logging detector section 14, are interconnected with certain components described in the aforementioned application SN 259,073, whereby the accelerator is caused to produce a pulsed output of fast neutrons, and whereby the logging detector section 14 is synchronously rendered responsive for only two preselected time intervals following each accelerator-produced pulse of neutrons. These components are shown generally in FIGURE 3 as a synchronizing and pulsing circuit 44, and may be seen to generate and to apply an actuating or "sync" pulse simultaneously to the high voltage generator 4 and the detector gating circuit 40 by way of leads 46C, 46A, and 46B. From the detector gating circuit 40, which will hereinafter be explained, the sync signal is conducted to the grounded primary winding of transformer 46, the secondary winding of which is connected between conductors 30 and 36 in a manner to form a balanced transmission line. As will also be hereinafter explained, conductors 30 and 36 are connected at the surface to receive B+ power for the subsurface instrument 20, and this power is carried to the detector gating circuit 40, discriminator 41, photomultiplier tube 42, and the synchronizing and pulsing circuitry 44, by leads 47–50.

It should be understood that the detector section 14 shown in FIGURE 1 may include any suitable type of detection means, depending upon the type of radiation sought to be detected. For example, if the thermal neutrons themselves are sought to be detected, then the detection means should be primarily responsive to thermal neutrons and should preferably be substantially non-responsive to gamma rays. Such detection means might be a boron trifluoride counter, a helium-3 counter, or a scintillation counter having a suitable crystal. On the other hand, if the gamma rays arising from thermal neutron capture are sought to be detected, the best detection means has been found for these purposes to be a scintillation counter having a thallium-activated, cesium iodide crystal. The crystal is preferably cylindrical, at least one inch thick, and at least 4 inches long. A very effective cesium iodide crystal has been found for these purposes to be round cylindrical in shape, at least 1¾ inches thick, and approximately 6 inches long, since such a crystal is capable of optimum sensing under average well logging conditions.

When gamma rays are sought to be detected, the crystal 43 shown in FIGURE 3 should be spaced as close as possible to the target (not depicted) of the accelerator 6, to "see" a maximum of the sought-for gamma rays, but not so close as to "see" any significant amounts of the gamma rays arising from activated oxygen nuclei. Since oxygen-16 nuclei have a relatively high activation threshold, and since fast neutrons from the accelerator 6 rapidly slow to less than the energy level of this threshold, such activation generally occurs only in the fluids and formation substances which are substantially adjacent the target portion of the accelerator 6. Specifically, if the crystal 43 is spaced 12–15 inches from the target of the accelerator 6, the crystal 43 will see an optimum number of the sought-for gamma rays without seeing a significant number of the oxygen gammas, especially if the crystal 43 is arranged to precede the accelerator 6 through the bore hole during logging operations.

Referring again to FIGURE 3, there may be seen the crystal 43 arranged in optical coupling with the photomultiplier tube 42, the output of which is connected to a suitable pulse height discriminator 41. The trigger level of the discriminator 41 is preferably set low enough to pass as many radiation-induced pulses as possible, and yet to screen out as many unwanted pulses (radiations) as possible. If a source-detector spacing is chosen which is within the aforementioned 12–15 inch range, it has been found that neutron bombardment activates the iodine nuclei in the crystal 43 and generates substantial amounts of beta radiation. These unwanted beta rays produce output pulses from the photomultiplier tube 42 of amplitudes up to about 2.1 mev., and although "background" in character, vary in intensity according to variations in the character of the formations traversing the borehole. In cases such as that wherein the borehole is filled with "fresh" water (any non-saline fluid), the thermal neutron capture cross section of the borehole fluid will often be smaller than that of formations such as shales. Accordingly, the bulk of the gamma ray population present will be those produced by neutron capture reactions with the hydrogen nuclei in the borehole fluid, which gamma rays have an initial energy of about 2.2 mev. In such cases, it may be desirable to set the trigger level of the discriminator 41 as high as 2.4 mev., to effectively restrict the detection signal to gamma rays resulting from capture reactions with calcium nuclei, etc., in the formations, and to thereby avoid the deleterious effect of the borehole fluid. On the other hand, substantially all of the unwanted beta-induced pulses can be eliminated with a trigger level setting as low as 1.9 mev., and therefore it may be generally stated that such settings should be restricted generally to a 1.9–2.4 mev. range for purposes of measuring the decline of a thermal neutron population. A particular useful setting has been found to be 2.2 mev., which passes much of the hydrogen gammas, but which completely eliminates the unwanted bata radiation from the logging signal.

The output signal from the discriminator 41 is passed through the detector gating circuit 40 to conductor 38. Although the reason is not clearly understood, it has been found that signals transmitted over conductor 38, the center conductor in the cable 22, arrive at the surface with less distortion and less interference from signals passing in adjacent conductors, than do signals traveling in any of the other conductors. Accordingly, since the output of the discriminator 41 is the signal which is primarily sought to be measured at the surface, it has been found most desirable to transmit this signal alone over the center conductor 38 in the cable 22. The output signal from the casing collar locator 18 is connected to conductor 34.

Figure 4:
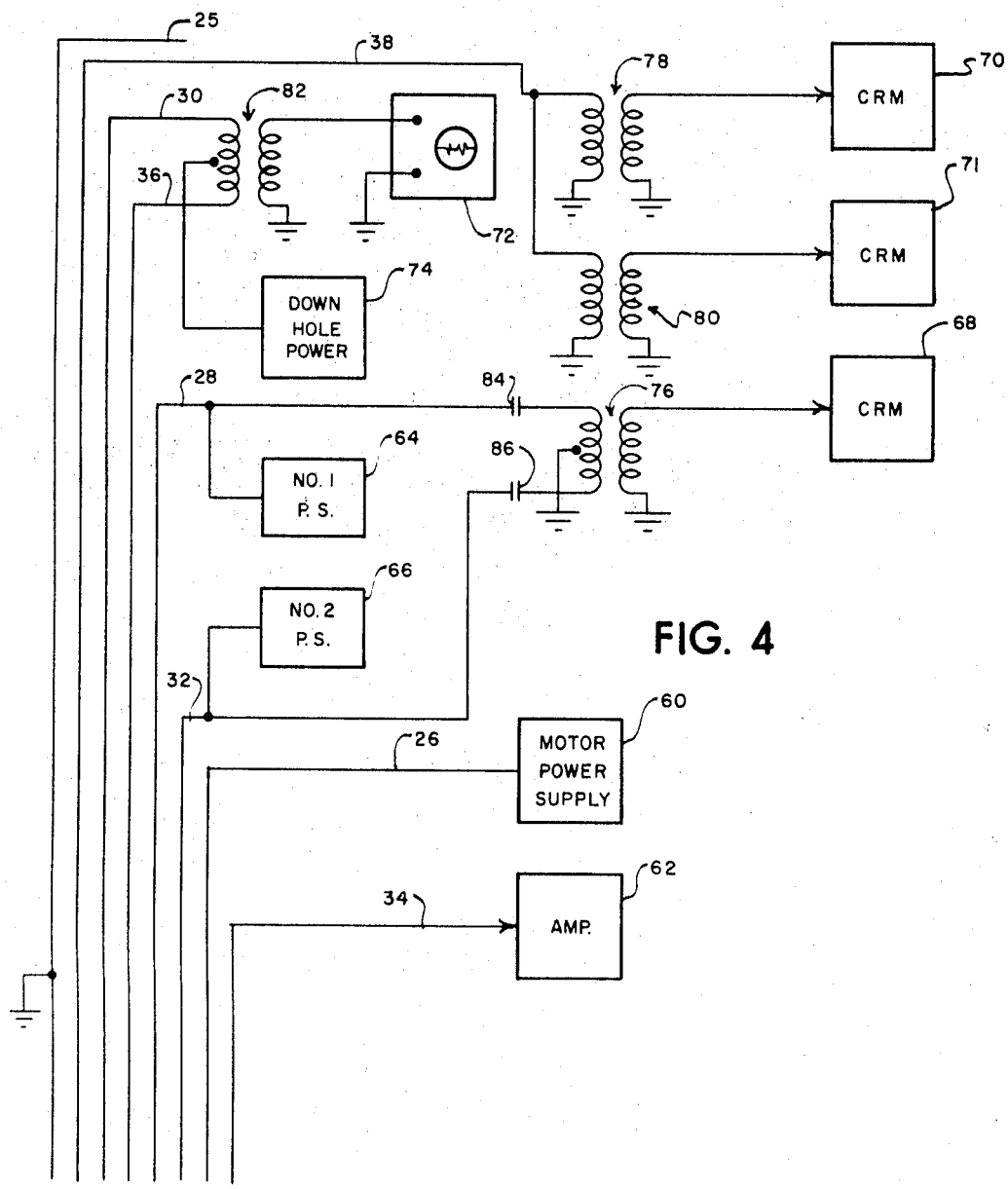
FIGURE 4 is a functional diagram of the major portions of the circuitry and components connected at the surface of the cable depicted in FIGURES 1–3.

Referring now to FIGURE 4, there may be seen a functional representation of certain components located at the surface of the earth, and also showing the manner in which they are interconnected with the various conductors 26–38 in the logging cable 22. In particular, there may be seen the motor power supply 60, the casing collar locator amplifier 62, the No. 1 and No. 2 filament power supplies 64–66 which generate control current for the two atmosphere control elements 7–8, respectively, and a count rate meter 68 for determining the rate at which radiations are sensed by the monitor detector 10. Also shown are the count rate meters 70–71 for determining the rate at which radiations are sensed by the logging detector 14 during the first and second detection intervals, respectively, an oscilloscope 72 for providing a visual representation of the frequency of the sync signal, and the downhole power supply 74 which produces B+ power for the detector gating circuit 40, and the sychronizing pulsing circuit 44, in the instrument 20.

As may be seen, the count rate meters 68, 70 and 71, are connected to receive their respective inputs from the secondary windings of transformers 76, 78, and 80. On the co-pending patent application SN 361,159, now patent No. 3,358,142, filed Apr. 20, 1964, by E. C. Hopkinson and A. B. C. Marshall, there is described means by which the detector section 14 is gated as hereinbefore described, and also means by which the output detector pulses generated during the second detection interval are reversed with respect to polarity. Accordingly, count rate meter 70 is preferably adapted to accept only the positive pulses representing radiations detected during the first interval, and count rate meter 71 is preferably adapted to accept only the negative pulses representing radiations detected during the second interval.

Conductors 30 and 36 are interconnected to the primary winding of transformer 82 in the manner of a balanced transmission line, and function to couple the sync pulses generated by the synchronizing and pulsing circuit 44 through the secondary winding to the oscilloscope 72. The downhole power supply 74 is connected to a tap on the primary winding of transformer 82 in the manner of a phantom coupling, so that conductors 30 and 36 may carry power down to those components in the instrument 20 which require such power. The No. 1 and 2 filament power supplies 64 and 66, which generate D.C. outputs, are coupled respectively to conductors 28 and 32. Capacitors 84 and 86 are preferably connected between conductors 28 and 32, respectively, and the primary winding of transformer 76, to block these D.C. outputs from the grounded center tap in this winding.

Figure 5:
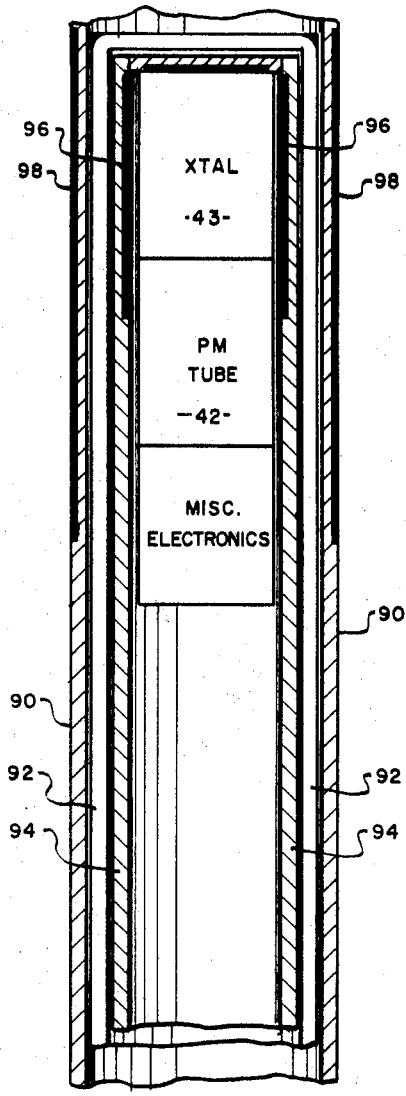
FIGURE 5 is a cross sectional representation of the detector portion of the instrument depicted generally in FIGURE 1.
Figure 2:
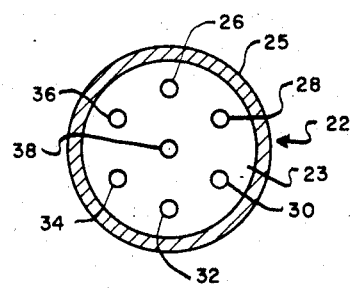
FIGURE 2 is a cross sectional representation of the logging cable employed in a preferred form of the present invention.

Referring now to FIGURE 5, there may be seen a cross sectional representation of the basic components in the detector section 14 depicted in FIGURE 1. In particular, the portion of the instrument 20 is composed of the steel instrument housing 90 enclosing a double-walled vacuum flask 92 which, in turn, houses a thin metal cannister 94 commonly known as the "water bottle." Inside the water bottle 94 may be found the crystal 43 and photomultiplier tube 42 depicted in FIGURE 3. The water bottle 94 may conventionally include other components which are not concerned with the present invention, and which are not depicted in FIGURE 5.

As hereinbefore stated, if the thermal neutrons are sought to be directly detected and counted, then the detector section 14 depicted in FIGURE 1 should preferably be responsive substantially only to thermal neutrons. In such a case, it is preferable that nothing be interposed between the crystal 43 and the surrounding formation which will abnormally obstruct these neutrons. However, if it is the gamma radiation arising from thermal neutron capture which is sought to be detected, then it is desirable to screen out incident neutrons from the crystal 43 to reduce or prevent activation of its iodide nuclei. Accordingly, it has been found effective to coat the exterior surfaces, of that portion of the water bottle 94 which encompasses the crystal 43, with boron-10 to block out a substantial number of these neutrons. This may be most effectively done by applying a viscous mixture of equal parts of powered boron-10 and epoxy resin, and then letting it harden into an effective inner shield 96 for thermal and epithermal neutrons.

It has been found that fast neutrons engage in inelastic scattering reactions with nuclei in the steel instrument housing 90, and that these gammas sometimes form a troublesome interference with the thermal neutron capture gamma rays sought to be detected and measured. Such radiation may be effectively reduced by applying a similar boron-10 and epoxy resin mixture to the outer surface of that portion of the instrument housing 90 which encompasses the crystal 43. As shown in FIGURE 5, the outer shield 98 is preferably made to extend beyond and to overlap the inner shield 96.

It has been stated herein that the detector section 14 is gated in a manner such that the photomultiplier tube 42, or some other portion of the detector section 14, is rendered responsive or active for only limited portions of time. However, the detector section 14 may, in the alternative, be rendered continuously responsive and surface-located means may be provided for selecting desired portions of the detection signal (with respect to time) after it has been received at the surface. Such a technique will permit simplification of the circuitry located in the subsurface logging instrument 20. Irrespective of whether the "gating" function is performed in the instrument 20, or at the surface, a particularly effective gating sequence has been found to be a 100 microsecond first detection or measurement interval commencing 400–500 microseconds after each sync pulse, and a second 100 microsecond detection or measurement interval commencing 700–900 microseconds after such sync pulse.

Numerous other variations and modifications may obviously be made without departing from the concept of the present invention. Accordingly, it should be clearly understood that those forms of the present invention which are described herein and depicted in the accompanying drawings, are illustrative only, and are not intended to limit the scope of the invention.

What is claimed is:
1. A radioactivity well logging system comprising
   an elongated hollow instrument housing adapted to be passed longitudinally through a borehole in the earth and having a portion of its exterior surface coated with a mixture of boron-10 and epoxy resin;
   a deuterium-tritium accelerator disposed in the lower end of said housing in a manner to irradiate subsurface earth formations surrounding said borehole and having a target section;
   a high voltage generator in said housing in electrical connection with said accelerator;
   a motor located in said housing for energizing said high voltage generator;
   a pair of atmosphere control elements connected to said accelerator;
   an end window monitor detector having its end window adjacent the target section of said accelerator;
   a logging detector section disposed in said coated portion of said instrument housing and comprising
      a heat resistant container,
      a water resistant container disposed in said heat resistant container and having at least a portion of its exterior surface coated with a mixture of boron-10 and epoxy resin,
      a photomultiplier tube disposed in said water resistant container,
      a cesium iodide crystal at least four inches long disposed in said water resistant container in optical connection with said photomultiplier tube,
      said crystal being spaced at least 12 inches and not more than 15 inches from said target section of said accelerator, and
      a pulse height discriminator connected to said photomultiplier tube and having a trigger level set at approximately 2.2 mev.;
   a tungsten radiation shield in said housing interposed between said accelerator and said logging detector section in a manner to partially encompass said monitor detector;
   synchronizing and pulsing means located in said housing for generating sync pulses to periodically pulsing said accelerator;
   detector gating means responsive to said sync pulses for actuating said photomultiplier tube during a first 100 microsecond detection interval commencing approximately 400 microseconds after each sync pulse and during a second 100 microsecond detection interval commencing at least 700 and not more than 900 microseconds after each sync pulse, said gating means also reversing the polarity of pulses generated by said discriminator during each of said second intervals;
   a casing collar locator means located in said housing;
   surface power and signal processing equipment comprising
      a first count rate meter,
      a second count rate meter responsive only to pulses of a first polarity,
      a third count rate meter responsive only to pulses of a second polarity,
      an oscilloscope,
      a downhole power supply,
      a motor power supply,
      a pair of atmosphere control element power supplies, and,
      an amplifier; and
   a grounded armored well logging cable having six insulated conductors arranged in an equi-distant and circular manner therein and having a seventh conductor located in the center therein equi-distantly of said other six conductors,
      the first of said six conductors being interconnected between said motor power supply and said motor,
      the second and fourth of said six conductors being connected as a balanced transmission line between said monitor detector and said first count rate meter and as independent conductors, respectively, between said atmosphere control elements and said atmosphere control element power supplies,
      the third and sixth of said six conductors being connected as a balanced transmission line to conduct said sync pulses from said detector gating means to said oscilloscope and to conduct power from said downhole power supply to said detector gating means and said synchronizing and pulsing means, the fifth of said six conductors being connected between said casing collar locator means, and said seventh conductor being interconnected between said detector gating means and said second and third count rate meters and carrying only output pulses from said discriminator.

2. A radioactivity well logging system comprising
an elongated hollow instrument housing adapted to be passed longitudinally through a borehole in the earth and having a portion of its exterior surface coated with a mixture of boron-10 and epoxy resin;
a deuterium-tritium accelerator disposed in the lower end of said housing in a manner to irradiate subsurface earth formations surrounding said borehole and having a target section;
a high voltage generator in said housing in electrical connection with said accelerator;
a motor located in said housing for energizing said high voltage generator;
a pair of atmosphere control elements connected to said accelerator;
an end window monitor detector having its end window adjacent the target section of said accelerator;
a logging detector section disposed in said coated portion of said instrument housing and comprising
  a heat resistant container,
  a water resistant container disposed in said heat resistant container and having at least a portion of its exterior surface coated with a mixture of boron-10 and epoxy resin,
  a photomultiplier tube disposed in said water resistant container,
  a cesium iodide crystal at least four inches long disposed in said water resistant container in optical connection with said photomultiplier tube,
  said crystal being spaced at least 12 inches and not more than 15 inches from said target section of said accelerator, and
  a pulse height discriminator connected to said photomultiplier tube and having a trigger level set at approximately 2.2 mev.;
a tungsten radiation shield in said housing interposed between said accelerator and said logging detector section in a manner to partially encompass said monitor detector;
synchronizing and pulsing means located in said housing for generating sync pulses to periodically pulsing said accelerator;
detector gating means responsive to said sync pulses for periodically actuating said photomultiplier tube for at least two preselected detection intervals following each pulsation of said accelerator and for reversing the polarity of pulses generated by said discriminator during each of said second intervals;
a casing collar locator means located in said housing;
surface power and signal processing equipment comprising
  a first count rate meter,
  a second count rate meter responsive only to pulses of a first polarity,
  a third count rate meter responsive only to pulses of a second polarity,
  an oscilloscope,
  a downhole power supply,
  a motor power supply,
  a pair of atmosphere control element power supplies, and,
  an amplifier; and
a grounded armored well logging cable having six insulated conductors arranged in an equi-distant and circular manner therein and having a seventh conductor located in the center therein equi-distantly of said other six conductors,
  the first of said six conductors being interconnected between said motor power supply and said motor,
  the second and fourth of said six conductors being connected as a balanced transmission line between said monitor detector and said first count rate meter and as independent conductors, respectively, between said atomsphere control element power supplies,
  the third and sixth of said six conductors being connected as a balanced transmission line to conduct said sync pulses from said detector gating means to said oscilloscope and to conduct power from said down-hole power supply to said detector gating means and said synchronizing and pulsing means,
  the fifth of said six conductors being connected between said casing collar locator means, and
  said seventh conductor being interconnected between said detector gating means and said second and third count rate meters and carrying only output pulses from said discriminator.

3. A radioactivity well logging system comprising
an elongated hollow instrument housing adapted to be passed longitudinally through a borehole in the earth;
a deuterium-tritium accelerator disposed in the lower end of said housing in a manner to irradiate subsurface earth formations surrounding said borehole and having a target section;
a high voltage generator in said housing in electrical connection with said accelerator;
a pair of atmosphere control elements connected to said accelerator;
an end window monitor detector having its end window adjacent the target section of said accelerator;
a logging detector section disposed in said instrument housing and comprising
  a photomultiplier tube,
  a cesium iodide crystal at least four inches long disposed in optical connection with said photomultiplier tube,
  said crystal being spaced at least 12 inches and not more than 15 inches from said target section of said accelerator, and
  a pulse height discriminator connected to said photomultiplier tube and having a trigger level set at approximately 2.2 mev.;
a tungsten radiation shield in said housing interposed between said accelerator and said logging detector section in a manner to partially encompass said monitor detector;
synchronizing and pulsing means located in said housing for generating sync pulses to periodically pulsing said accelerator;
detector gating means responsive to said sync pulses for periodically actuating said photomultiplier tube for at least two preselected detection intervals following each pulsation of said accelerator and for reversing the polarity of pulses generated by said discriminator during each of said second intervals;
surface power and signal processing equipment comprising
  a first count rate meter,
  a second count rate meter responsive only to pulses of a first polarity,
  a third count rate meter responsive only to pulses of a second polarity,
  an oscilloscope,
  a first power supply,
  a second power supply, and
  a pair of atmosphere control element power supplies; and
a grounded armored well logging cable having at least five insulated conductors arranged in an equi-distant and circular manner therein and having a sixth conductor located in the center therein equi-distantly of said other five conductors,
the first of said five conductors being interconnected between said second power supply and said high voltage generator,
the second and fourth of said five conductors being connected as a balanced transmission line between said monitor detector and said first count rate meter and as independent conductors, respectively, between said atmosphere control elements and said atmosphere control element power supplies,
the third and fifth of said five conductors being connected as a balanced transmission line to conduct said sync pulses from said detector gating means to said oscilloscope and to conduct power from said downhole power supply to said detector gating means and said synchronizing and pulsing means,
said sixth conductor being interconnected between said detector gating means and said second and third count rate meters and carrying only output pulses from said discriminator.

4. A radioactivity well logging system comprising
an elongated hollow instrument housing adapted to be passed longitudinally through a borehole in the earth;
a deuterium-tritium accelerator disposed in the lower end of said housing in a manner to irradiate subsurface earth formations surrounding said borehole and having a target section;
a high voltage generator in said housing in electrical connection with said accelerator;
a pair of atmosphere control elements connected to said accelerator;
a monitor detector adjacent said accelerator;
a logging detector section disposed in said instrument housing and comprising
a photomultiplier tube,
a cesium iodide crystal at least four inches long disposed in optical connection with said photomultiplier tube,
said crystal being spaced at least 12 inches and not more than 15 inches from said target section of said accelerator, and
a pulse height discriminator connected to said photomultiplier tube having a trigger level set at approximately 2.2 mev.;
synchronizing and pulsing means located in said housing for generating sync pulses to periodically pulsing said accelerator;
detector gating means responsive to said sync pulses for periodically actuating said photomultiplier tube for at least two preselected detection intervals following each pulsation of said accelerator and for reversing the polarity of pulses generated by said discriminator during each of said second intervals;
surface power and signal processing equipment comprising
a first count rate meter,
a second count rate meter responsive only to pulses of a first polarity,
a third count rate meter responsive only to pulses of a second polarity,
an oscilloscope,
a first power supply,
a second power supply,
a pair of atmosphere control element power supplies;
a grounded armored well logging cable having at least five insulated conductors arranged in an equi-distant and circular manner therein and having a sixth conductor located in the center therein equi-distantly of said other five conductors,
the first of said five conductors being interconnected between said second power supply and said high voltage generator,
the second and fourth of said five conductors being conducted as a balanced transmission line between said monitor detector and said first count rate meter and as independent conductors, respectively, between said atmosphere control elements and said atmosphere control element power supplies;
the third and fifth of said five conductors being connected as a balanced transmission line to conduct said sync pulses from said detector gating means to said oscilloscope and to conduct power from said downhole power supply to said detector gating means and said synchronizing and pulsing means,
said sixth conductor being interconnected between said detector gating means and said second and third count rate meters and carrying only output pulses from said discriminator.

5. A radioactivity well logging system comprising
an elongated hollow instrument housing adapted to be passed longitudinally through a borehole in the earth;
a deuterium-tritium accelerator disposed in the lower end of said housing in a manner to irradiate subsurface earth formations surrounding said borehole and having a target section;
a high voltage generator in said housing in electrical connection with said accelerator;
a motor located in said housing for energizing said high voltage generator;
a pair of atmosphere control elements connected to said accelerator;
an end window monitor detector having its end window adjacent the target section of said accelerator;
a logging detector section disposed in said instrument housing and comprising
a heat resistant container,
a water resistant container disposed in said heat resistant container and having at least a portion of its exterior surface coated with a mixture of boron-10 and epoxy resin,
a photomultiplier tube disposed in said water resistant container,
a cesium iodide crystal at least four inches long disposed in said water resistant container in optical connection with said photomultiplier tube,
said crystal being spaced at least 12 inches and not more than 15 inches from said target section of said accelerator, and
a pulse height discriminator connected to said photomultiplier tube and having a trigger level set at approximately 2.2 mev.;
a tungsten radiation shield in said housing interposed between said accelerator and said logging detector section in a manner to partially encompass said monitor detector;
synchronizing and pulsing means located in said housing for generating sync pulses to periodically pulsing said accelerator;
detector gating means responsive to said sync pulses for periodically actuating said photomultiplier tube for at least two preselected detection intervals following each pulsation of said accelerator and for reversing the polarity of pulses generated by said discriminator during each of said second intervals;
a casing collar locator means located in said housing;
surface power and signal processing equipment comprising
a first count rate meter,
a second count rate meter responsive only to pulses of a first polarity,
a third count rate meter responsive only to pulses of a second polarity, an oscilloscope,
a downhole power supply,
a motor power supply,
a pair of atmosphere control element power supplies, and,
an amplifier; and
a grounded armored well logging cable having six insulated conductors arranged in an equi-distant and circular manner therein and having a seventh conductor located in the center therein equi-distantly of said other six conductors,
the first of said six conductors being interconnected between said motor power supply and said motor,
the second and fourth of said six conductors being connected as a balanced transmission line between said monitor detector and said first count rate meter and as independent conductors, respectively, between said atmosphere control elements and said atmosphere control element power supplies,
the third and sixth of said six conductors being connected as a balanced transmission line to conduct said sync pulses from said detector gating means to said oscilloscope and to conduct power from said downhole power supply to said detector gating means and said synchronizing and pulsing means,
the fifth of said six conductors being connected between said casing collar locator means, and
said seventh conductor being interconnected between said detector gating means and said second and third count rate meters and carrying only output pulses from said discriminator.

6. A radioactivity well logging system comprising
an elongated hollow instrument housing adapted to be passed longitudinally through a borehole in the earth;
a deuterium-tritium accelerator disposed in the lower end of said housing in a manner to irradiate subsurface earth formations surrounding said borehole and having a target section;
a high voltage generator in said housing in electrical connection with said accelerator;
a motor located in said housing for energizing said high voltage generator;
a pair of atmosphere control elements connected to said accelerator;
an end window monitor detector having its end window adjacent the target section of said accelerator;
a logging detector section disposed in said instrument housing and comprising
a photomultiplier tube,
a cesium iodide crystal at least four inches long disposed in optical connection with said photomultiplier tube,
said crystal being spaced at least 12 inches and not more than 15 inches from said target section of said accelerator, and
a pulse height discriminator connected to said photomultiplier tube and having a trigger level set at approximately 2.2 mev.;
a tungsten radiation shield in said housing interposed between said accelerator and said logging detector section in a manner to partially encompass said monitor detector;
synchronizing and pulsing means located in said housing for generating sync pulses to periodically pulsing said accelerator;
detector gating means responsive to said sync pulses for periodically actuating said photomultiplier tube for at least two preselected detection intervals following each pulsation of said accelerator and for reversing the polarity of pulses generated by said discriminator during each of said second intervals;
a casing collar locator means located in said housing;
surface power and signal processing equipment comprising
a first count rate meter,
a second count rate meter responsive only to pulses of a first polarity,
a third count rate meter responsive only to pulses of a second polarity,
an oscilloscope,
a downhole power supply,
a motor power supply,
a pair of atmosphere control element power supplies, and,
an amplifier; and
a grounded armored well logging cable having six insulated conductors arranged in an equi-distant and circular manner therein and having a seventh conductor located in the center therein equi-distantly of said other six conductors,
the first of said six conductors being interconnected between said motor power and said motor,
the second and fourth of said six conductors being connected as a balanced transmission line between said monitor detector and said first count rate meter and as independent conductors, respectively, between said atmosphere control elements and said atmosphere control element power supplies,
the third and sixth of said six conductors being connected as a balanced transmission line to conduct said sync pulses from said detector gating means to said oscilloscope and to conduct power from said downhole power supply to said detector gating means and said synchronizing and pulsing means,
the fifth of said six conductors being connected between said casing collar locator means, and
said seventh conductor being interconnected between said detector gating means and said second and third count rate meters and carrying only output pulses from said discriminator.

References Cited

UNITED STATES PATENTS

| | | | |
|---|---|---|---|
| 3,145,771 | 8/1964 | Pennebaker | 250—83.6 |
| 3,176,136 | 3/1965 | Hopkinson | 250—84.5 |
| 3,219,820 | 11/1965 | Hall | 250—83.3 |
| 3,244,882 | 4/1966 | Baldwin et al. | 250—83.3 |
| 3,246,157 | 4/1966 | Reed et al. | 250—108 |
| 3,248,544 | 4/1966 | Reed et al. | 250—71.5 |
| 3,256,438 | 6/1966 | Armistead | 250—83.6 |
| 3,263,083 | 7/1966 | Johnson et al. | 250—83.6 |
| 3,302,165 | 1/1967 | Anderson et al. | 250—83.6 |
| 1,625,125 | 4/1927 | Latour. | |
| 3,090,940 | 5/1963 | Vogel | 174—113 X |

RALPH G. NILSON, *Primary Examiner.*

S. ELBAUM, *Assistant Examiner.*

U.S. Cl. X.R.
174—32; 250—83.6